United States Patent [19]

Thakrar et al.

[11] Patent Number: 4,895,529
[45] Date of Patent: Jan. 23, 1990

[54] ENVIRONMENTALLY SEALED CONNECTOR

[75] Inventors: Anil C. Thakrar, Camp Hill; John P. Redmond, Mechanicsburg; Paul C. Schubert, Jr., Harrisburg; Clair W. Snyder, Jr., York, all of Pa.

[73] Assignee: AMP Incorporated, Harrisburg, Pa.

[21] Appl. No.: 862,902

[22] Filed: May 13, 1986

Related U.S. Application Data

[63] Continuation-in-part of Ser. No. 453,327, Dec. 27, 1982, abandoned.

[51] Int. Cl.⁴ .................................. H01R 13/40
[52] U.S. Cl. ........................ 439/281; 439/588/586
[58] Field of Search ............... 439/271, 278, 281, 282, 439/284, 286, 287, 289–293, 586–588

[56] References Cited

U.S. PATENT DOCUMENTS

| | | | |
|---|---|---|---|
| 1,871,397 | 7/1929 | Watts | 439/281 |
| 2,037,630 | 7/1929 | Hudson | 439/281 |
| 2,761,111 | 2/1953 | Klosterman | 339/91 |
| 2,782,391 | 2/1957 | Kirk | 339/211 |
| 2,840,676 | 5/1956 | King | 201/67 |
| 2,881,406 | 4/1959 | Arson | 439/281 |
| 3,199,060 | 8/1965 | Marasco | 339/60 |
| 3,474,386 | 6/1968 | Link | 339/60 |
| 3,611,255 | 10/1971 | Shroyer | 339/60 |
| 3,665,368 | 5/1972 | Ellis | 339/60 |
| 3,688,244 | 8/1972 | Savoca et al. | 339/60 |
| 3,707,696 | 12/1972 | Carter | 339/17 |
| 3,747,048 | 7/1973 | Johnson et al. | 339/75 |
| 3,757,789 | 9/1983 | Shanker | 128/404 |
| 3,832,674 | 8/1974 | Florian | 339/60 |
| 3,838,382 | 9/1974 | Sugar | 339/59 R |
| 3,880,487 | 4/1975 | Goodman et al. | 339/60 |
| 3,937,545 | 2/1976 | Cairns et al. | 339/60 |
| 3,970,352 | 7/1976 | Dorrell et al. | 339/59 M |
| 4,090,759 | 5/1978 | Herrmann, Jr. | 339/60 |
| 4,116,521 | 9/1978 | Herrmann, Jr. | 339/60 |
| 4,291,932 | 9/1981 | Cox | 339/60 |
| 4,293,182 | 10/1981 | Schwartz | 339/275 |
| 4,417,736 | 11/1983 | Herrmann, Jr. | 277/212 |
| 4,421,369 | 12/1983 | Myking | 339/36 |
| 4,422,704 | 12/1983 | Williams | 339/91 |
| 4,588,242 | 5/1986 | McDowell et al. | 339/59 M |
| 4,601,528 | 7/1986 | Spier | 339/38 |
| 4,639,061 | 1/1987 | Muzslay | 339/59 M |
| 4,664,461 | 5/1987 | Schubert et al. | 339/59 M |

FOREIGN PATENT DOCUMENTS

| | | |
|---|---|---|
| 1415657 | 6/1969 | Fed. Rep. of Germany. |
| 986707 | 6/1961 | United Kingdom. |
| 2068654 | 8/1981 | United Kingdom. |

OTHER PUBLICATIONS

AMP Deutschland GmbH Catalog Nr. 53 "Econoseal E".
Copy of the European Search Report.

Primary Examiner—Paula Austin Bradley
Attorney, Agent, or Firm—Katherine A. Nelson

[57] ABSTRACT

An environmentally sealed electrical connector is comprised of plug and receptacle housing members, each member having a rigid portion and a flexible portion secured to one end thereof, and at least one electrical terminal receiving passageway extending through the rigid and flexible portions. The flexible portions of the passageways are dimensioned to accommodate and sealingly engage a variety of wire sizes terminated to electrical terminals which are received and disposed in the passageways of the assembled member. The plug member may be further comprised of a second flexible section secured at the other end of the rigid section, the second flexible section providing a resilient sealing member for environmentally sealing the interface when the receptable and receptacle members are mated.

19 Claims, 8 Drawing Sheets

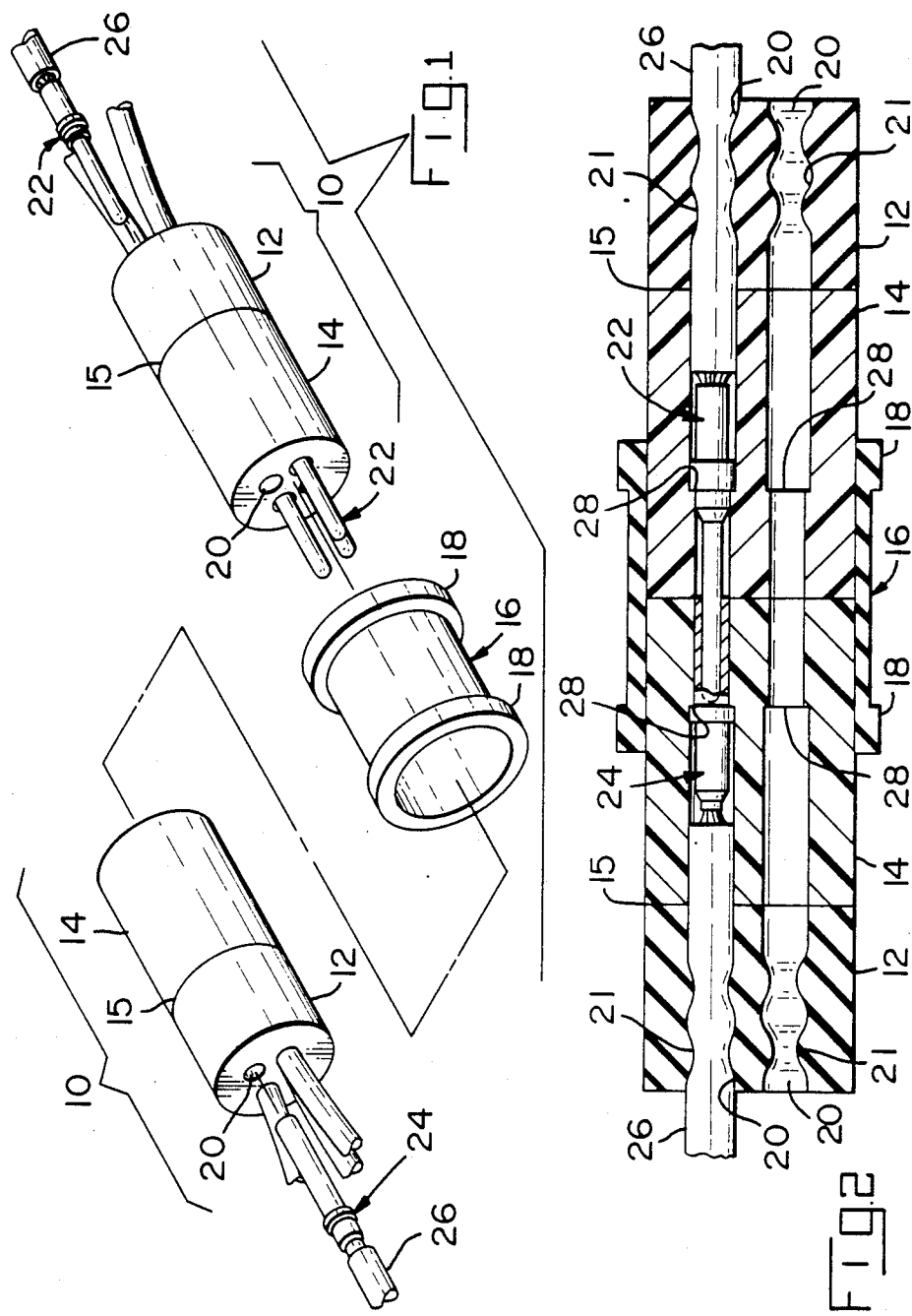

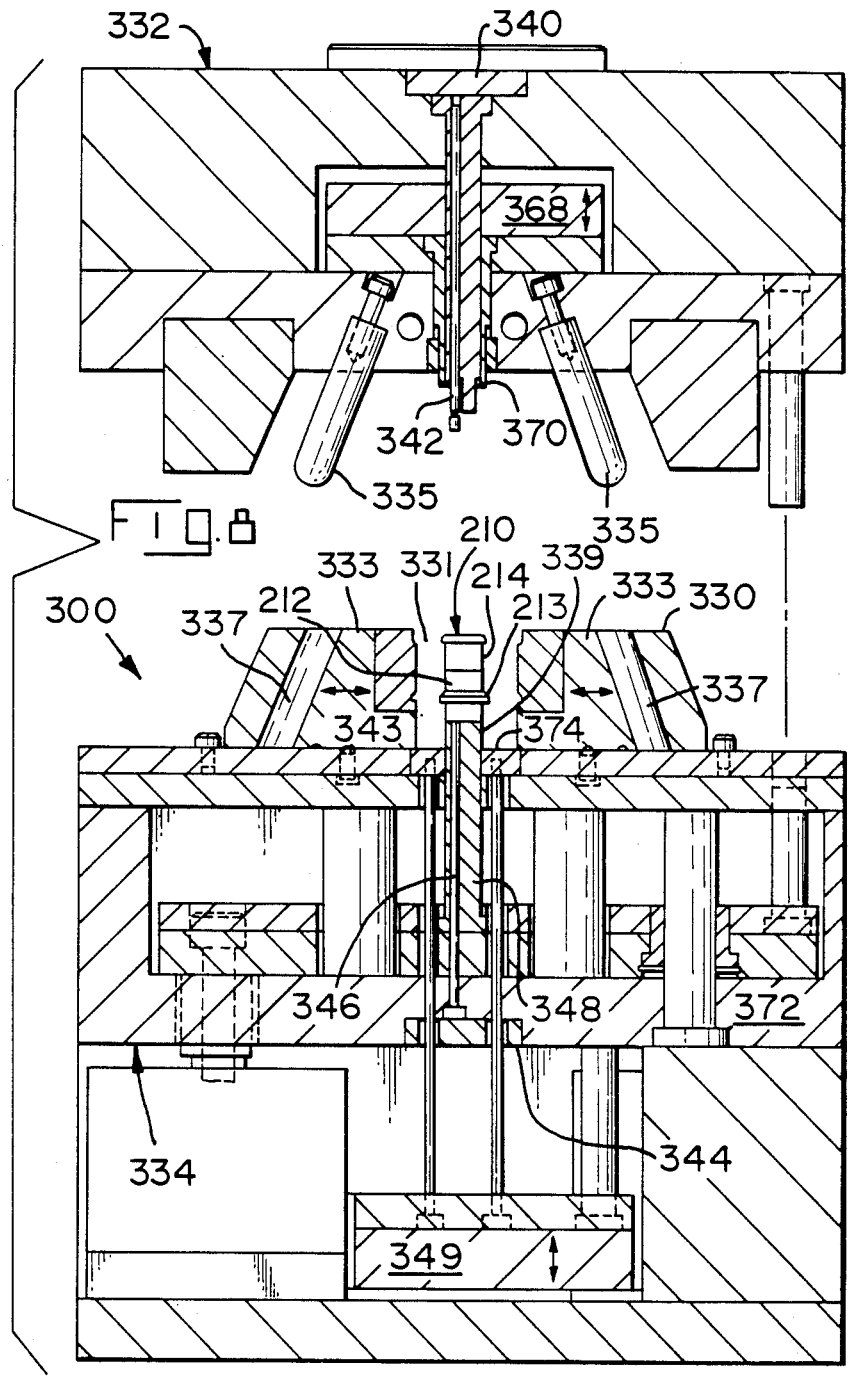

4,895,529

ENVIRONMENTALLY SEALED CONNECTOR

RELATED APPLICATION INFORMATION

This application is a continuation in part of U.S. patent application Ser. No. 453,327 filed Dec. 27, 1982, now abandoned.

FIELD OF THE INVENTION

This invention relates, generally, to an environmentally sealed connector and more particularly to an electrical connector having a connector housing which is comprised of a rigid section secured at one or both ends thereof to a flexible section.

BACKGROUND OF THE INVENTION

In the electrical connector arts the use of rigid and flexible materials for use in the same connector is old in the art. Such uses, however, were generally in the form of washers, O-rings or physical mating through glues, force fits or threading of flexible to rigid material. The purpose in such a combination is generally to provide environmental sealing or strain relief or to allow for replacement or insertion of contacts. U.S. Pat. No. 4,090,759 "Micro-Miniature Circular High Voltage Connector" issued May 23, 1978 to Hermann, Jr., and U.S. Pat. No. 3,838,382 "Retention System For Electrical Contacts" issued Sept. 24, 1974 to Sugar disclose such uses.

Since the use of rigid and flexible components for contact housings is great, it is desirable to have a contact housing in which the rigid and flexible material are integrally molded so as to become a unitary piece. One patent wherein relatively hard and relatively soft resilient material are used together for insulator bodies is found in British Patent Specification No. 968,707 "Multi-Hardness Resilient Connector Insulator" published Sept. 2, 1964. The insulator bodies were designed to be used in a rigid connector shell.

It is an object of the present invention to produce a connector housing wherein one end is of a rigid material and not merely relatively inflexible and the other end is of a flexible material thereby providing environmental sealing and restraining one end while providing a physically secure base at the remaining end.

It is a further object to have a connector housing wherein the interface between the two materials is relatively smooth and does not separate when pressure is exerted thereon.

It is another object of this invention to provide a connector housing having one section of rigid material secured at one end thereof to a section of flexible material which will accommodate and sealingly engage different wire sizes without the need to exert external pressure by use of rigid connector shell or other means.

In addition it is an object of this invention to provide a connector housing having a second section of flexible material secured to the other end of the rigid material to provide a flexible resilient sealing member for environmentally sealing the interface when the connector housing is mated with a complimentary housing member.

In addition it is an object of this invention to provide a mold for making the connector housings and a cost effective method for making same.

SUMMARY OF THE INVENTION

Accordingly, the present invention is directed to an environmentally sealed electrical connector characterized by a first housing member having at least one passageway therethrough for receiving electrical terminal member, the housing having at least a first portion which is of a rigid material and at least a second portion which is of a flexible resilient material, the portions having a chemical affinity at the interface point therebetween, at least one socket terminal disposed in each terminal receiving passageway in the first housing and the socket terminating to an electrical conductor, a second housing having at least one terminal receiving passageway extending therethrough, the housing having at least a first portion which is of a rigid material and at least a second portion which is of a flexible material, the portions having a chemical affinity at the interface point therebetween, and at least one pin terminal disposed in each terminal receiving passageway in the second housing, the pin terminal terminating to an electrical conductor.

The present invention is further directed to an environmentally sealed connector wherein at least one of the housing members has a flexible resilient sealing member at both ends of the rigid portion, the second flexible portion forming a means for environmentally sealing the interface when the plug and receptacle are mated.

The invention is further directed to a method of and mold for making the above connectors by dual injection molding.

Some of the objects and advantages of the invention having been stated, others will appear as the description proceeds, when taken in connection with the accompanying drawings.

BRIEF DESCRIPTION OF THE DRAWINGS

FIG. 1 is a partly exploded view of the connector of the present invention;

FIG. 2 is a cross-sectional view taken through an assembled connector of the present invention;

FIG. 7 is a partially exploded view of a further alternative embodiment of the present invention;

FIG. 7A is a fragmentary view of another alternative embodiment of the present invention;

FIG. 8 is a cross-sectional view of a mold used for manufacturing the connector of FIG. 4 showing the mold in its open position;

DESCRIPTION OF THE PREFERRED EMBODIMENT

Figure 3:
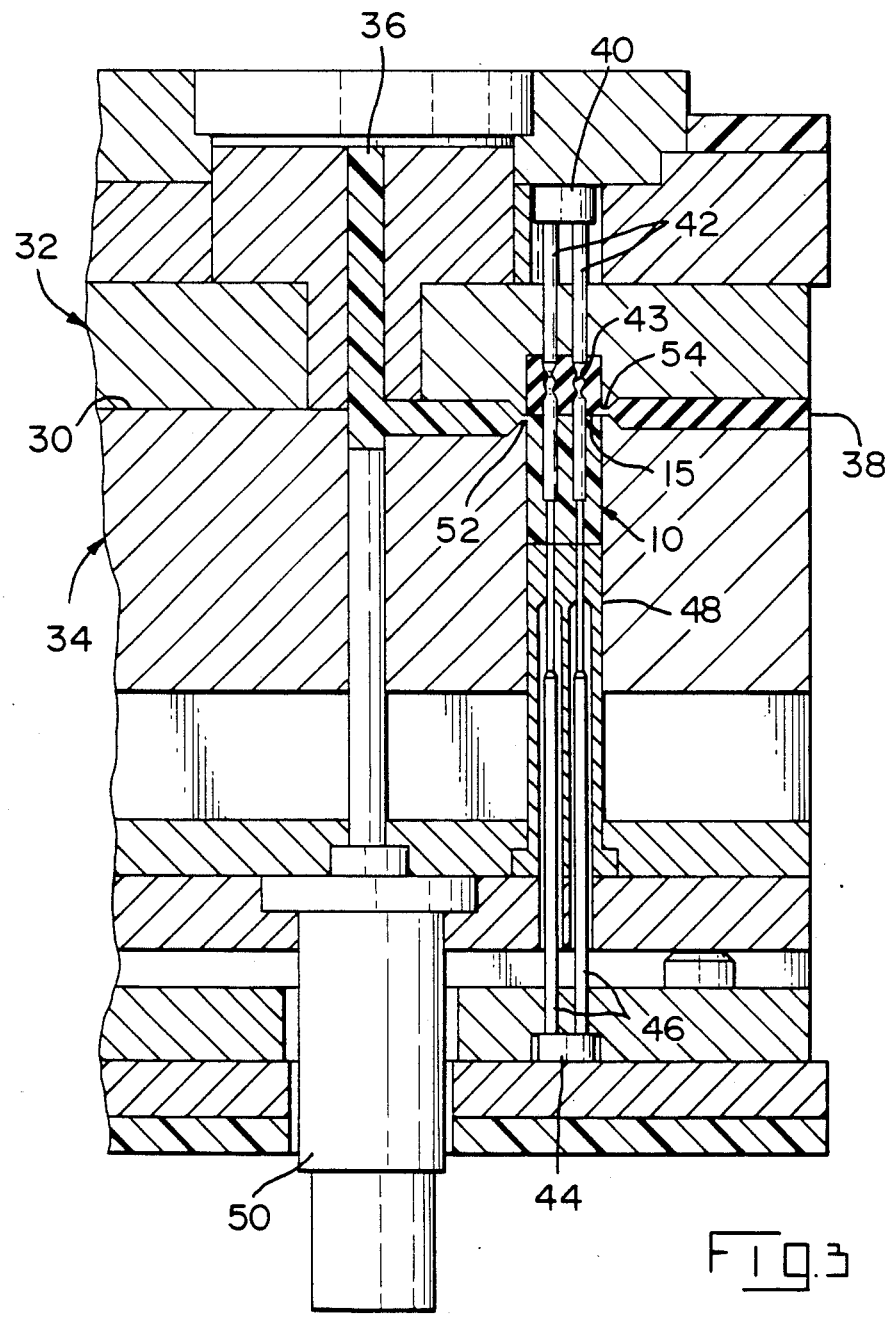
FIG. 3 is a cross-sectional view of a mold showing the manufacturing of the present invention.

FIG. 1 shows an exploded view of the connector of the present invention. The connector housing 10 has two portions, the housing flexible portion 12 and the housing rigid portion 14. Housing mating seal 16 is disposed between the two connector housings 10. Seal 16 provides environmental protection upon mating of the two connector housing halves (shown more clearly in FIG. 2). The housing mating seal 16 has a ridge 18 disposed at either end which additionally helps to rigidly hold the seal 16 onto the housing 10. Connector housings 10 have contact passageways 20 extending therethrough the passageways allowing insertion and/or removal of individual contacts. It is to be understood that the positioning and number of contact passageways 20 may vary without departing from the spirit and scope of the present invention. Also shown is a pin terminal 22 and a socket terminal 24 each having a wire 26 attached thereto. FIG. 1 further shows interface point 15 disposed on each of the connector housings 10 which demarcates the flexible and the rigid portions 12, 14.

A cross-sectional view of an assembled connector of the present invention is shown in FIG. 2. In this view it can be seen how the housing mating seal 16 is fitted over the exterior of the housing rigid portions 14. Also shown are the wires 26 which pass through the contact passageways 20 and are relatively rigidly held in place by a series of annular protrusions 21 extending into terminal receiving passageway 20 in the flexible portion 12. Protrusions 21 form an environmentally tight seal around the exterior of the wires 26 as well as providing strain relief. In addition to providing strain relief and sealing, the flexible protrusions allow the same housing member to be used for a plurality of sizes of wires while maintaining an environmental seal around the wires. Disposed in the interior of each passageway 20 are ledges 28 which provide for physical stops for the pin terminal 22 as well as the socket terminal 24. In this manner of construction the housings 10 are of a hermaphroditic nature, the pin or the socket terminals being usable in any of the housings 10.

The connector is assembled by inserting wires having terminals attached thereto into the flexible portion 12 until the terminals are seated against ledges 28 in rigid portion 14.

FIG. 3 shows a cross-sectional view of a molding portion of a machine utilized in the construction of the housing 10. The operation and general characteristics of the mold are generally known by one skilled in the art and therefore only a brief description will be found below. The mold has a parting line 30 which denotes the "A" end plate 32 from the "B" plate 34. Also shown is the position for injection of the rigid material 36 as well as the flexible material 38. Disposed on the mold is the upper pin 40 which has two upper core contact passageway forming pins 42. The number of passageway forming pins 42 is dictated by the number of terminal passageways 20 and may therefore vary accordingly. The lower core pin 44 has lower core terminal passageway forming pins 46 and thereby in conjunction with the upper core terminal passageway forming pins 42 form terminal passageways 20 through the housing 10. Further, the upper core passageway forming pins 42 have core pin indentations 43 disposed therein which are used to form annular protrusions 21 in the connector housing 10. An ejector sleeve 48 is utilized to eject a finished connector housing 10 from the mold as well as control the flow of the rigid and flexible materials 36, 38 as described below. A hydraulic cylinder 50 is used to separate the "A" plate 32 from the "B" plate 34 and from each other as described below.

The manufacturing of the component is accomplished by a closing of the mold plates "A" and "B" 32 34. The ejector sleeve 48 then moves upward to a point just slightly above the lower sprue 52 thereby prohibiting the introduction of rigid material 36 therethrough while leaving the upper sprue 54 open. The soft or flexible material 38 is then injected into the mold and forms the housing flexible portion 12. The ejector sleeve 48 is then retracted to the position shown in FIG. 3 thereby defining the total overall length of the housing 10. The rigid material 36 is then injected through the sprue 52 which forms the housing rigid portion 14. Since the housing flexible portion 12 remains in the upper portion of the mold in the position shown, the gate at the end of sprue 54 is blocked thus preventing additional flexible material 38 from entering into the mold before the introduction of the rigid material 36. Owing to the temperature of the rigid material 36 in relation to the flexible material 38, as well as the material utilized, it is believed a chemical affinity occurs between the two materials at the interface point 15. After the materials are sufficiently cooled the mold opens at the parting line 30 with the top core pins 42 moving outwardly until the housing 10 is out of the cavity. The mold then continues to open pulling the housing 10 from the top core pins 42 such that housing 10 remains in the "B" plate 34. The ejector sleeve 48 is then moved forward and ejects housing 10 from plate 34.

Figure 4:
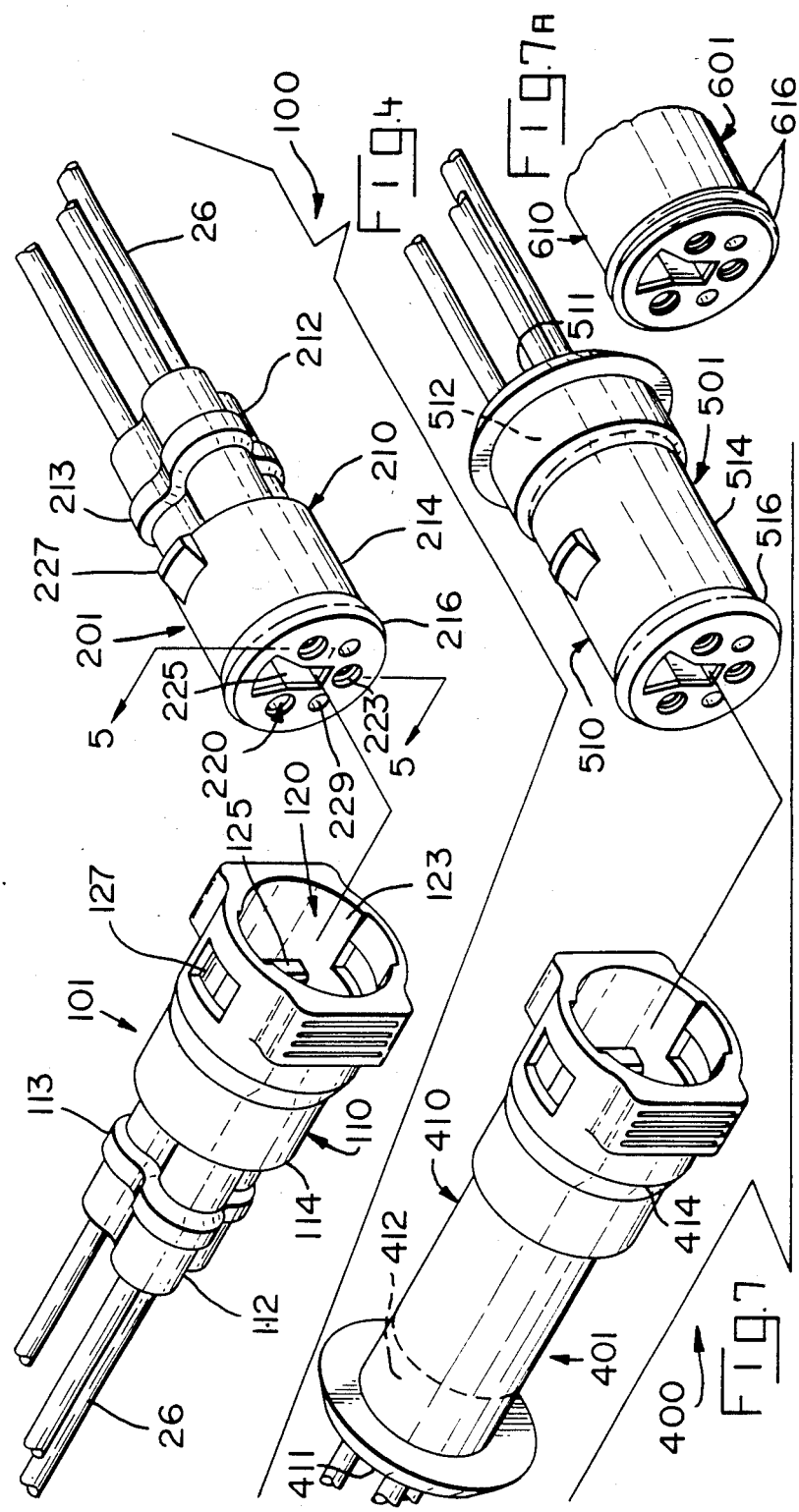
FIG. 4 is a partly exploded view of an alternative embodiment of the connector of the present invention.
Figure 5:
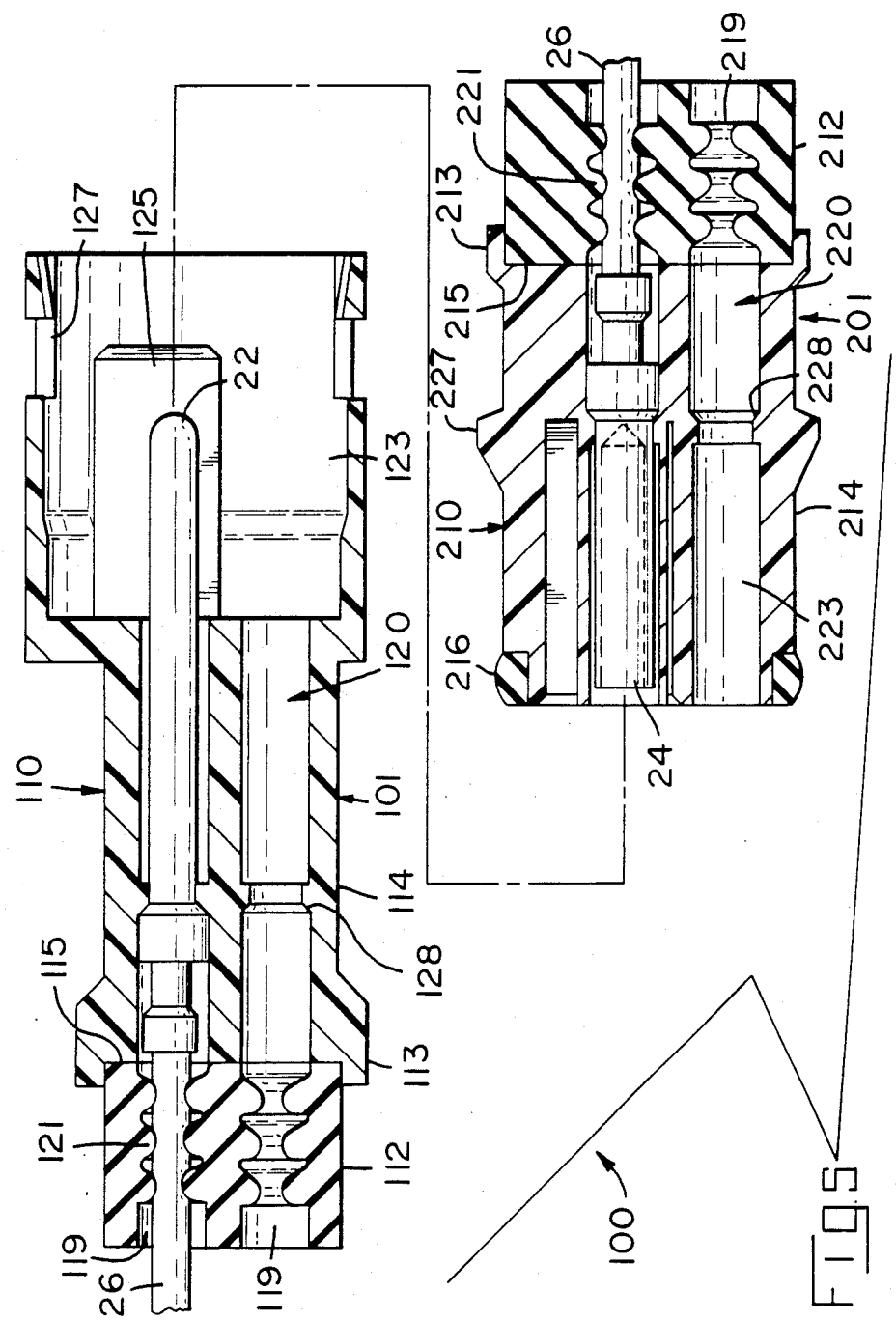
FIG. 5 is a cross-sectional view taken through the unassembled connector of FIG. 4.
Figure 6:
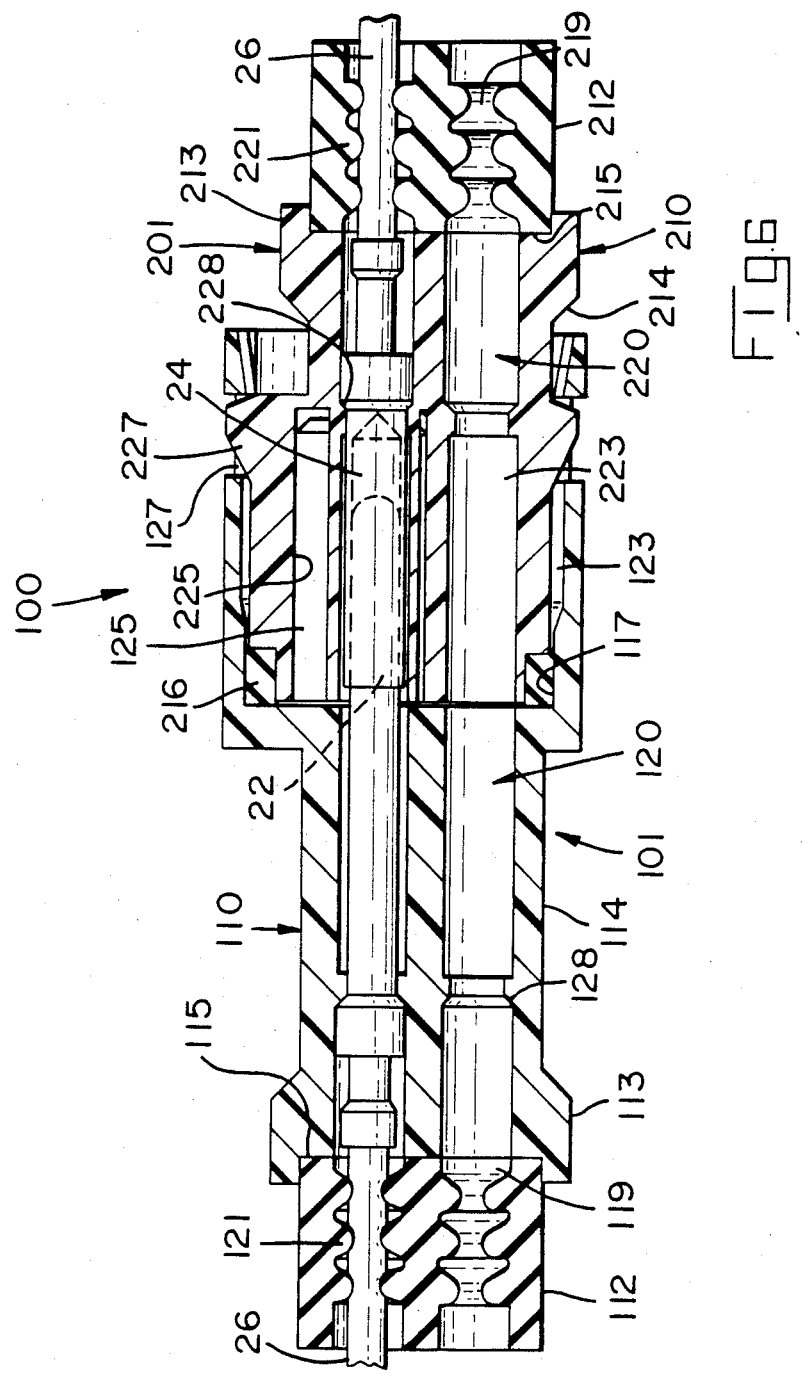
FIG. 6 is a cross-sectional view taken through the assembled connector of FIG. 4.

FIGS. 4, 5 and 6 disclose an alternative embodiment 100 of the environmentally sealed connector, having plug member 101 and receptacle member 201. Plug and receptacle member 101, 201 are comprised of housing members 110, 210, each housing member 110, 210 having flexible portions 112, 212 and rigid portions 114, 214 respectively. Housing members 110, 210 further have at least one electrical terminal receiving passageway 120, 220 extending therethrough, said passageways having flexible portions 119, 219 and rigid portions 123, 223 respectively as best seen in FIGS. 5 and 6. Housing members 110, 210 in alernative embodiment 100 are not hermaphroditic. The mating end of rigid passageway portion 123 of plug member 101 is dimensioned to receive rigid portion 214 of receptacle member 201 when connector 100 is mated. Thus eliminating sleeve member 18 shown in FIG. 1. Plug and receptacle members 101, 201 further have polarizing means to ensure proper alignment and means for locking the portions together. FIG. 4 also shows the use of optional bores 229 which may extend partially into rigid portion 214. Similar bores may be used in rigid portion 114. These bores are used to reduce the amount of material used in molding the housing and to provide additional surface area for purposes of cooling the molded material. As can be seen in FIGS. 5 and 6, rigid portion 114 of plug member 101 has an annular ring 113 which extends partially over the interfacing surface 115 between flexible portion 112 and rigid portion 114. The majority of flexible portion 112 extends rearwardly from the back of rigid portion 114. Plug member 101 further has polarizing member 125 extending into passageway 123, which cooperates with polarizing passageway 225 in receptacle member 201 when the connector is mated. In addition, rigid portion 114 has at least one locking aperture 127 which cooperates with corresponding locking protrusion 227 on receptacle member 201.

Plug portion 101 has a pin terminal member 22 disposed in respective terminal receiving passageways 120, said pin terminals 22 being terminated to a conductor member 26. Terminal 22 is inserted into passageway 120 through flexible portion 119 and into rigid portion 123 until the collar on terminal rests against stop surface 128 in passageway portion 123. Annular protrusions 121 in flexible passageway portion 119 grip the wire to provide an environmental seal and strain relief. Since protrusions 121 are flexible, the same size housing and passgeways can accommodate several wire sizes while maintaining the integrity of the environmental seal.

The front portion of receptacle member 201 is further comprised of annular interfacial sealing member 216 having an arcuate sealing surface, formed of same flexible material as flexible portion 212. In this embodiment the arcuate sealing member is integrally molded onto the rigid portion 214 and functions as an O-ring. When the plug and receptacle members 101, 201 are mated, seal 216 is compressed within constricted portion 117 within plug passageway 123 and provides an envionmental seal. Rigid portion 214 of receptacle 201 has an annular ring 213 which extends partially over interfacing surfaces 215 between the two materials.

Receptacle member 201 has a socket terminal 24 disposed in each terminal receiving passageway 220, each socket terminal 24 being terminated to a conductor member 26. Socket terminals 24 are inserted into flexible portion 219 of passageways 220 in the same manner as previously described. Passageway portions 219 have annular protrusions 221 which function in the same manner as protrusions 121 in plug member 101. Socket terminal 24 is inserted within passageway 220 until its collar engages stop surface 228 as shown in FIGS. 5 and 6.

When plug and receptacle members 101, 201 are mated as shown in FIG. 6, pin terminal 22 are engaged in socket terminals 24, interfacial seal 216 is in sealing engagement at 117 within plug member 101 and locking protrusion 227 on receptacle member 201 is engaged in locking aperture 127 of plug member 101.

FIG. 7 shows a further alternative embodiment 400 of the connector comprised of plug 401 and receptacle 501. In this embodiment rigid portions 414, 514 of plug housing 410 and receptacle housing 510 extend rearwardly to essentially surround flexible portions 412, 512 (shown in phantom), except at rear surfaces 411, 511. Receptacle 501 includes interfacial seal member 516 at a front end thereof.

FIG. 7A shows a further plug embodiment 601 wherein rigid portion 610 has a plurality of annular interfacial sealing members 616 disposed at the mating end thereof.

Figure 9:
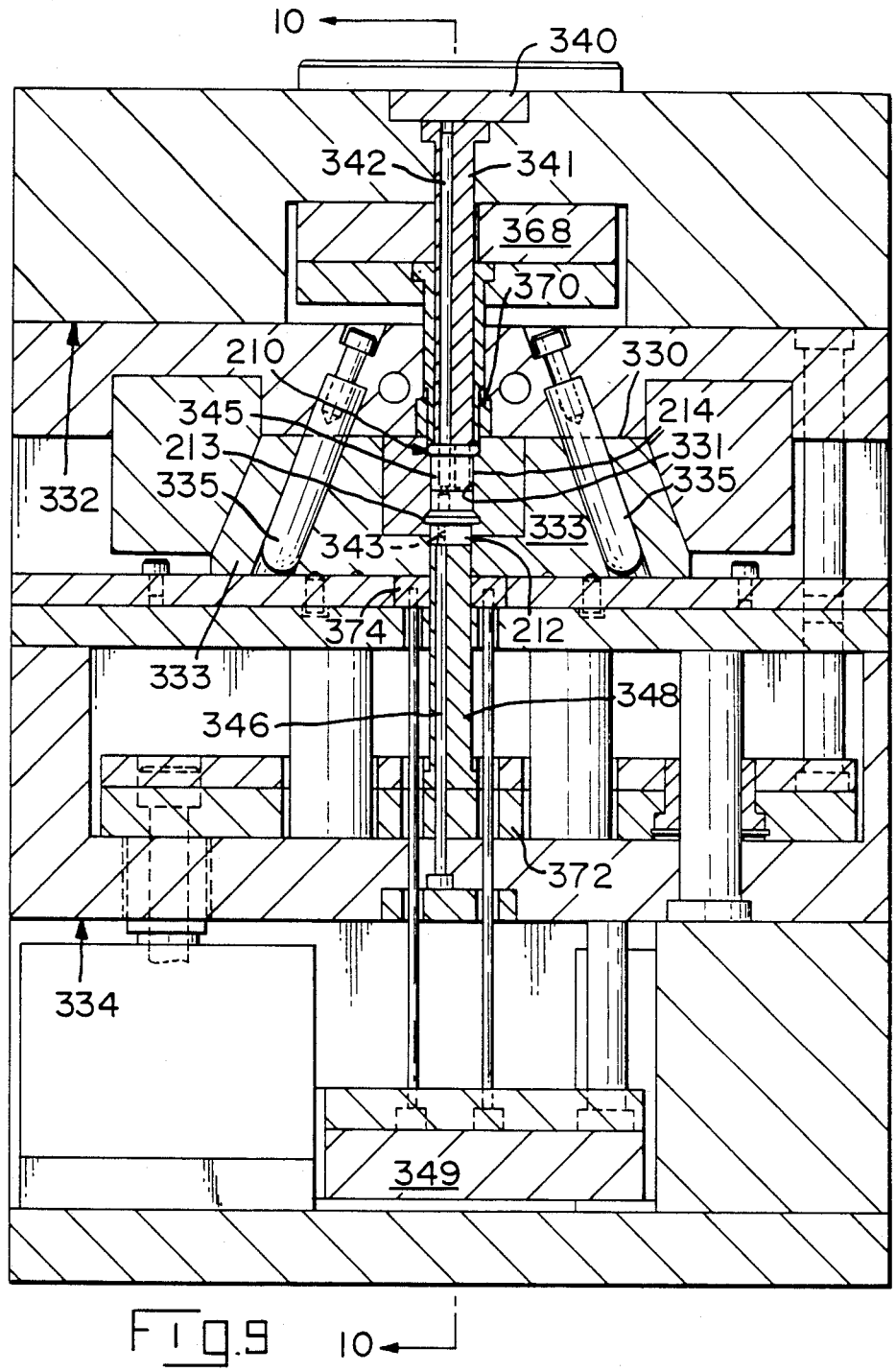
FIG. 9 is a cross-sectional view of the mold of FIG. 8 in its closed position.
Figure 10:
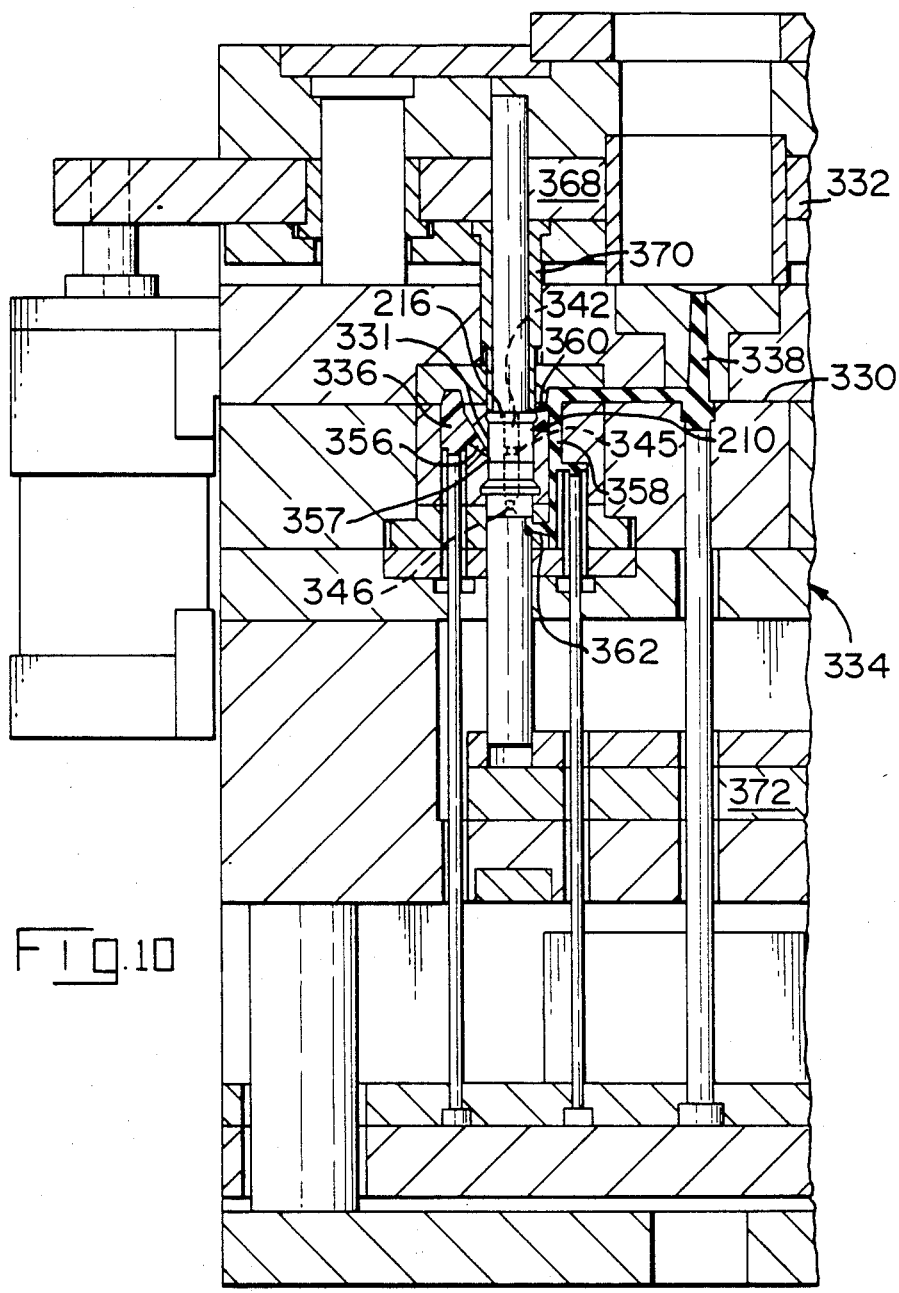
FIG. 10 is a cross-sectional view of the mold taken along line 10—10 of FIG. 9.

FIGS. 8, 9 and 10 illustrate the operation of mold 300 used to form receptacle portion 201 of alternative embodiment 100 wherein flexible material 338 is injected onto both ends of the rigid material 336. FIG. 8 shows mold 300 in its open position, immediately prior to ejection of receptacle portion 201. FIG. 9 shows the formed receptacle portion 201 in the closed mold. FIG. 10 is taken along line 10—10 in FIG. 9 and shows the runner system for injecting rigid and flexible materials 336, 338. Mold 300 is comprised of two plates 332 and 334 which separate at parting line 330. Upper plate 332 contains stationary upper core pin plate 340 on which are mounted core pins 342 which form part of terminal receiving passageway 220; core pin 341 which forms polarizing passageway 225; and core pins (not shown) for forming bores 229 in rigid portion 214. Lower plate 334 contains stationary lower core pin plate 344 on which are mounted core pins 356 for forming the remaining part of terminal receiving passageway 220; and ejector mechanism 348. The number of core pins 356 in lower core pin plate 344 correspond to the number of pins 342 on upper core pin plate 340. When the mold is closed, corresponding core pins 342 and 346 meet at 345 to form continuous pins for forming terminal receiving passageways 220.

Mold 330 is further comprised of two blocks 333, mounted on lower mold plate 334 which together form connector housing forming cavity 331. Blocks 333 have cavities 337 therein for receiving arms 335 which extend from upper mold plate to move blocks 333 into position as mold 300 closes. Blocks 333 move outwardly in a horizontal direction as arms 335 are withdrawn from blocks 333 when mold 300 is opened (indicated by the arrow) to release the external surface of the molded housing from the mold.

FIG. 10 is a view taken at right angles to FIG. 9 and illustrates the sprue, runner and gate system for forming housing 210. Rigid material 336 is injected into cavity 331 through sprue 356 entering at gate 357. Flexible material 338 is injected into desired locations in cavity 331 through sprue 358 entering at gates 360 and 362.

To mold connector housing 210 in accordance with the invention plate 334 is moved into position against block 332, causing arms 335 to enter bores 337 to move blocks 333 into position to form cavity 331; pin 341 to enter cavity 331 for forming polarizing passageway 225; and core pin 342 to enter cavity 331 and engage respective core pins 346 in lower plate 334.

Plate 368 is then lowered to insert block 370 into upper end of cavity 331 and plate 372 is partially raised to insert end 339 of ejector sleeve 348 into the opposite end of cavity 331, thus preserving these portions of the cavity for subsequent injection of flexible material 338. Rigid material 336 is injected into cavity 331 through sprue 356 to form rigid portion 214. Rigid material 336 is allowed to solidify on its surface prior to removing block 370 and ejector sleeve end 339 to provide space for molding the flexible portions at both the interfacial seal 216 and wire seal 212 areas. Molten flexible material 338 is injected into the desired areas and is allowed to cool. Since the rigid portion 214 is not completely cooled before the second material is introduced into the mold, there is some surface melting of the first material resulting in thermal intermingling of the two materials and consequent molecular affinity at the interfacial areas.

After the housing 210 has cooled sufficiently to retain its shape, mold 300 is opened along parting line 330. Plate 332 is moved away from plate 334 thus removing core pins 342, 341 from the housing and arms 335 from block bores 337 accompanied by movement of blocks 333 to release the outer surfaces of housing member 210. Connector housing member 210 is ejected from lower plate 334 by action of ejector sleeve 348 and ejector plate 374 being moved against flexible portion 212 and flange 213 by upward movement of plates 372 and 349 respectively.

Thermosetting as well as thermoplastic materials may be used to make connector housings in accordance with this invention. Thermoplastic materials are preferred, however, because of reduced cycle time needed between successive moldings. With thermoset materials, the mold must be maintained at a high temperature for a sufficient period of time to allow the material to cure. With thermoplastic materials, the mold needs to be cooled for a relatively short period of time to allow the material to set. The type of materials used depend upon the specific application for the connector. Generally thermosetting materials are used whenever the connectors will be used at elevated temperatures. The preferred types of materials are thermoplastics, thermoplastic elastomers and thermosetting rubbers. Fillers that may be added to the rigid materials include conductive as well as nonconductive materials such as metallic particles, conductive nonmetals, metalized nonconductive materials, glass fibers, etc.

To increase the chemical affinity between the two portions of the connector, it is preferred that a similarly based polymer be used in forming the rigid material 36, 336 and flexible material 38, 338. The basic polymer is modified to provide the desired characteristics. Preferbly the rigid material is flame retardant filled material and the flexible material is unfilled and may contain antioxidants and other additives for controlling flow and release from the mold. In addition, materials having compatible but different polymer bases may be combined.

Where desired, antioxidants and other additives were added in accordance with the following procedure: fluid additives were added via a fluid pump of known calibrated output. Dry additives were measured and mixed with pellets of the base resin material. A twin screw extruder was used to blend the material prior to entering the mold. Fluid additives are added just prior to the time the dry ingredients left the material hopper and entered the extruder.

The following examples illustrate the invention. They are not to be construed as limitations on the instant invention except as indicated in the appended claims. All compositions are expressed as parts by weight except where specifically indicated otherwise.

EXAMPLE 1

An apparatus such as that shown in FIGS. 8-10 was used to produce connector housings as follows. A quantity of POLYFLAM RPP1174 containing about 0.1 percent IRGANOX 1010 and 0.2 percent SEENOX 412S, two antioxidants, was injected into the mold cavity formed with the slides in the forward positions at a pressure of about 70 kg/cm sq. at about 193° C. The slides were then retracted to expose the gates of the areas into which the Santoprene 201-64 at about 196° C. was injected at a pressure of about 100 kg/cm sq. The mold was maintained at about 10° C. The total cycle time was between 30 and 80 seconds.

POLYFLAM RPP1174 is a polypropylene available from A. Schulman Inc., Akron, Ohio. IRGANOX 1010 is tetrakis-[methylene 3-(3',5'-di-tert-butyl-4'-hydroxyphenyl)proprionate] methane which is available from CIBA GEIGY, Inc. SEENOX 412S is pentaerythritol tetrakis(b-laurylthiopropionate), and is available from Argus Chemical Division, Witco Chemical Corp., Brooklyn, N.Y. Santoprene 201-64 is a dynamic vulcanizate comprising ethylene-propylene-diene monomer (EPDM) rubber particles with an average size of 0.001 mm dispersed in a matrix of polypropylene available from Monsanto Polymer Products Company.

EXAMPLE 2

Example 2 was the same as Example 1 except that the POLYFLAM RPP1174 L did not contain the antioxidants.

EXAMPLE 3

Example 3 was the same as Example 2 except that the Santoprene 201-64 included about 2.5 percent of 12,500 centistroke SILICONE FLUID, SWS-101. SILICONE FLUID, SWS-101 is a polydimethylsiloxane available from SWS Silicones Corp., Edison, N.J.

EXAMPLE 4

Example 4 was the same as Example 3 except that Santoprene 101-64 was used instead of Santoprene 201-64. The Santoprene 101-64 was injected at about 196° C. at about 100 kg/cm sq.

EXAMPLE 5

Example 5 was carried out in a prototype mold for thermoset materials which was maintained at an average temperature of about 185° C. The first material, a non-reinforced EPDM, was injected with a pressure of about 28 kg/cm sq. This material was allowed to cure for about 20 seconds, then the second material, a 15 percent glass reinforced EPDM, was injected with a pressure of about 49 kg/cm sq. and allowed to cure for about 240 seconds. The completed item was then ejected from the mold.

The following compositions were used for the non-reinforced and reinforced EPDMs.

| Non-reinforced EPDM | |
| --- | --- |
| Component | Amount - Parts by Weight |
| Vistalon 3777[1] | 175 |
| Zinc oxide | 20 |
| Burgess Icecap K[2] | 300 |
| Sunpar 2280[3] | 35 |
| Di-Cup 40KE[4] | 9 |
| Silane A-172[5] | 1.5 |
| Agerite MA[6] | 1.5 |

[1]Vistalon 3777 is a high molecular weight 75 percent oil extended EPDM available from Exxon Chemical Americas, Houston, Texas.
[2]Burgess Icecap K is an anhydrous aluminum silicate available from Burgess Pigment Co., Macon, Georgia.
[3]Sunpar 2280 is a paraffinic oil available from Sun Oil Co., Philadelphia, Pennsylvania.
[4]Di-Cup 4OKE is dicumyl peroxide on Burgess KE Clay, 40 percent active, available from Hercules Incorporated, Wilmington, Delaware.
[5]Silane A-172 is a vinyl silane available from Union Carbide Corp., Danbury, Connecticut.
[6]Agerite MA is a polymerized 1,2-dihydro-2,2,4 trimethyl quinoline available from R. K. Vanderbilt, Norwalk, Connecticut.

| Reinforced EPDM | |
| --- | --- |
| Component | Amount - Parts by Weight |
| Vistalon 6505[7] | 40 |
| Vistalon 3708[8] | 40 |
| LD 400[9] | 20 |
| Zinc oxide | 20 |
| Suprex Clay[10] | 30 |
| Mistron Vapor Talc[11] | 55 |
| Burgess Icecap K | 45 |
| FEF Black[12] | 20 |
| HAF Black[13] | 20 |
| Sunpar 2280 | 35 |
| Stearic Acid | 1 |
| Glass[14] fibers | 49 |
| Di-Cup 4OKE | 9 |
| Silane A 172 | 1.5 |
| Agerite MA | 1.5 |

[7]Vistalon 6505 is a medium viscosity, fast curing EPDM available from Exxon.
[8]Vistalon 3708 is a high viscosity EPDM available from Exxon.
[9]LD 400 is a low density polyethylene available from Exxon.
[10]Suprex Clay is a hydrated aluminum silicate available from J. M. Huber Corp., Macon, Georgia.
[11]Mistron Vapor Talc is magnesium silicate available from Cypress Minerals Co., Los Angeles, California.
[12]FEF Black is carbon black having particles with diameters in size range of 30-40 × 10$^{-6}$ mm available from Phillips Petroleum Co., Bartlesville, Oklahoma.
[13]HAF Black is carbon black having particles with a diameter of 27-29 × 10$^{-6}$ mm, available from Phillips Petroleum Co.
[14]Available from Owens-Corning Fiberglas Corp., Toledo, Ohio.

The formulations were made using a banbury Mixer technique as described in U.S. Pat. No. 4,373,048, which is incorporated by reference herein.

The Banbury Mixer technique has one and two pass systems both of which start by introducing the polymer into the mixer to be softened by shear and heat. Then fillers and dry ingredients are added and mixed until a homogeneous mixture is obtained. Thereafter, the liquid components are added and mixed to achieve a homogeneous mixture. At this point for the two pass system, the mixture is removed and cooled, after which it is reintroduced to the mixer and at a lower temperature the catalyst or curing agents are added in the second pass and the mixture can be stored and subsequently placed in mold to achieve the necessary curing and cross linking. In the one pass system, the catalysts or curing agents can simply be added and the mix subjected to molding and allowed to cool.

Other materials which are believed to be useful in practicing this invention include, but are not limited to, other polypropylenes, glass reinforced polybutylene terephthalate, glass reinforced and un-reinforced nylon, and reinforced polyolefinic elastomers, for the rigid materials; and copolyester thermoplastic elastomers, styrene terpolymers, and interpenetrating network polymers of olefinic-based elastomers with silicon for flexible materials.

It is to be understood that many variations of the present invention may be utilized without departing from the spirit and scope of the present invention. For example, differing shapes of connecting housings such as rectangular and/or oblong may be utilized as well as different sizes. Additionally, the contact apertures may vary in size and/or shape from housing to housing and with respect to each other. Also, a contact and housing arrangement may be utilized in conjunction with bulkhead connectors, circuit boards, and may therefore only require one connector and housing as opposed to the pair shown in the drawings. Further, other types of contact arrangements may be utilized which may include the use of cables other than electrical cables such as, for example, fiber optics, adaptor arrangements wherein socket or pin contacts are disposed at both ends of a connector or a combination thereof.

Therefore, in addition to the above enumerated advantages the disclosed invention produces an environmentally sealable connector which is suitable for a multitude of uses and which is cost effective as well as easy to manufacture.

In the drawings and specification, there has been set forth preferred embodiments of the invention, and although specific terms are employed, they are used in a generic and descriptive sense only, and not for purposes of limitation.

We claim:

1. A connector housing, comprising:
    a rigid section formed of plastic material having first passageway means extending therethrough in which terminal means will be secured;
    a flexible section formed of plastic material having second passgeway means extending therethrough from an end face and in communication with said first passageway means and along which conductor means terminated to the terminal means will extend, said second passageway means being sized for sealingly engaging the conductor means;
    said rigid section and said flexible section are integrally molded and are secured together at an interface therebetween by forming a chemical affinity therebetween, the shape of the interface between said rigid and flexible sections being essentially the same as the shape of the end face of the flexible section; and
    at least one sealing member formed of flexible plastic material at a front end of said rigid section integrally molded thereon and secured thereon by a chemical affinity therebetween, the shape of the interface between said rigid section and flexible sealing member being essentially the same as the shape of the end face of the flexible sealing member, said sealing member being sealingly engageable with a sealing surface of a complementary connector housing.

2. The connector housing as described in claim 1, wherein the plastic material of said rigid section is selected from the group consisting of reinforced olefinic-based thermoplastic elastomers, ethylene-propylene terpolymers, reinforced and nonreinforced nylons, reinforced and unreinforced polypropylenes, reinforced polybutylene terephthalates, and reinforced ethylene-propylene diene monomers.

3. The connector housing as claimed in claim 1, wherein the thermoplastic material of said flexible section is selected from the group consisting of non-reinforced olefinic-based thermoplastic elastomers, ethylene-propylene terpolymers, copolyester thermoplastic elastomers, styrene terpolymers, flexible polyamides, interpenetrating network polymers of olfinic-based elastomers with silicon, dynamic vulcanizates and unreinforced ethylene-propylene diene monomers.

4. The connector housing as described in claim 1, wherein said at last one sealing member has an arcuate sealing surface.

5. The connector housing as described in claim 1 wherein said rigid section further includes polarizing means.

6. The connector housing of claim 1 wherein the shape of said interface between said rigid and flexible sections and the shape said end face surface are flat.

7. The connector housing of claim 1 wherein said interface between said rigid and flexible sections and said end face surface are perpendicular to the axis of said terminal receiving passageways.

8. The connector housing of claim 1 wherein said interface between said rigid and flexible sections and said end face surface are made by the same surface on an aligned portion of an axially movable sleeve member in a mold, said sleeve member being movable in a direction parallel to the axis of core pins which form the terminal receiving passageways in said housing.

9. The connector housing of claim 1 wherein the shape of a first surface of at least one flexible material parallel to the axis of the terminal receiving passageways differs from the shape of a second surface of the flexible materials parallel to the axis of the terminal receiving cavities.

10. The connector housing of claim 1 wherein the shape of the interface between the rigid and flexible section has the same shape as the face perpendicular to the terminal receiving passageways and sealing portion.

11. An electrical connector comprising: first and second mateable housing portions;
    said first housing portion including a rigid section formed of plastic-material and a flexible section formed of plastic material, said rigid and flexible sections being integrally molded and secured together at an interface therebetween by chemical affinity between said rigid and flexible plastic materials, the shape of the interface between said rigid and flexible sections being essentially the same as the shape of the end face of the flexible section;

said first housing portion having a first passageway means extending through said rigid and flexible sections, said passageway means being dimensioned for receiving and securely engaging first terminal means terminated to conductor means, said conductor means being sealingly engaged in the flexible section of said passageway;

said first housing portion further having at least one arcuate sealing member formed of flexible plastic material at a front end of said rigid section said member being integrally molded thereto and secured thereon by chemical affinity therebetween, the shape of the interface between said rigid section and flexible sealing member being essentially the same as the shape of the end face of the flexible sealing member, said at least one sealing member sealingly engageable with a sealing surface of said second housing portion;

said second housing portion having a second rigid section formed of plastic material secured to a second flexible section of plastic material, said second sections being secured by chemical affinity at the interface therebetween, the shape of the interface between said second rigid and flexible sections being essentially the same as the shape of the end face of the second flexible section;

said second housing portion further having a second passageway means extending through said rigid and flexible sections, said second passageway means being dimensioned for receiving and securing second terminal means terminated to second conductor means, said second conductor means being sealingly engaged in the flexible section of said second passageway; whereby when said first and second housing portions are mated, said first and second passageway means are aligned with each other and said sealing member of said first housing portion sealingly engages said sealing surface of said second housing portion.

12. The electrical connector as described in claim 11 wherein a first electrical terminal means having conductor means terminated thereto is secured in said first passageway means, and a second electrical terminal means having second conductor means terminated thereto is secured in said second passageway means, said first and second terminal means being mateable.

13. The electrical connector as described in claim 11, wherein said at least one sealing member on said first housing portion has an arcuate sealing surface.

14. The electrical connector as described in claim 11 further including polarizing means for aligning said first and second mateable housing members.

15. The electrical connector as described in claim 11 further including locking means for lockingly engaging said first and second mateable housing members.

16. The connector as described in claim 10 wherein said first and second housing sections further include polarizing means.

17. The connector of claim 11 wherein the shape of said interface between said rigid and flexible sections of respective first and second housing portions and the shape of respective corresponding said end face surfaces are flat.

18. The connector of claim 11 wherein said interface between said rigid and flexible sections of respective first and second housing portion and respective corresponding said end face surfaces are perpendicular to the axis of respective said terminal receiving passageways.

19. A matable connector housing comprising:
first and second housing members, said first housing member including:
a rigid section formed of plastic material having first passageway means extending therethrough in which terminal means will be secured;
a flexible section formed of plastic material having second passageway means extending therethrough from an end face and in communication with said first passageway means and along which conductor means terminated to the terminal means will extend, said second passageway means being sized for sealingly engaging the conductor means;
said rigid section and said flexible section are integrally molded and are secured together at an interface therebetween by forming a chemical affinity therebetween, the shape of the interface between said rigid and flexible sections being essentially the same as the shape of the end face of the flexible section; and
at least one sealing member formed of flexible plastic material at a front end of said rigid section integrally molded thereon and secured thereon by a chemical affinity therebetween, the shape of the interface between said rigid section and flexible sealing member being essentially the same as the shape of the end face of the flexible sealing member; and
said second housing member including a sealing surface, said sealing surface being sealingly engageable with said sealing member of said first housing member.

* * * * *